United States Patent [19]

Munson

[11] 4,198,704
[45] Apr. 15, 1980

[54] PASSIVE UNDERWATER TARGET DETECTION AND LOCATING SYSTEM

[75] Inventor: John C. Munson, Silver Spring, Md.

[73] Assignee: The United States of America as represented by the Secretary of the Navy, Washington, D.C.

[21] Appl. No.: 802,575

[22] Filed: Mar. 27, 1959

[51] Int. Cl.² .............................................. G01S 3/80
[52] U.S. Cl. .............................. 367/125; 343/100 CL; 343/112 D
[58] Field of Search .............. 340/6, 16, 5, 6 R, 16 R; 343/100.7, 112, 100 CL, 112 D; 235/118, 68 C; 333/29, 65; 324/77; 181/0.51

[56] References Cited

U.S. PATENT DOCUMENTS

| 2,349,370 | 5/1944 | Orner ................................. 340/16 R |
| 2,415,088 | 2/1947 | Dingley, Jr. ........................ 343/116 |
| 2,418,136 | 4/1947 | Munson et al. .................... 340/16 R |
| 2,800,580 | 7/1957 | Davies .............................. 333/29 X |
| 2,897,351 | 7/1959 | Melton .......................... 343/100 CL |
| 2,932,002 | 4/1960 | Keiser ............................... 340/6 R |
| 2,958,039 | 10/1960 | Anderson .............................. 333/29 |

Primary Examiner—Richard A. Farley
Attorney, Agent, or Firm—R. S. Sciascia; A. L. Branning

EXEMPLARY CLAIM

1. A system for locating a radiating source comprising a plurality of mutually spaced radiation detectors, first means for correlating the output of one of said detectors with the output of a second of said detectors, second means for correlating the output of the second of said detectors with the output of a third detector, means coupled to said first and second correlating means for separately integrating the outputs thereof to produce a pair of integrated signals, and means for delaying one of said integrated signals with respect to the other of said integrated signals, whereby the delay is indicative of the range of the source from the detectors when the maximum amplitude of the delayed integrated signal coincides with the maximum amplitude of the other integrated signal.

15 Claims, 8 Drawing Figures

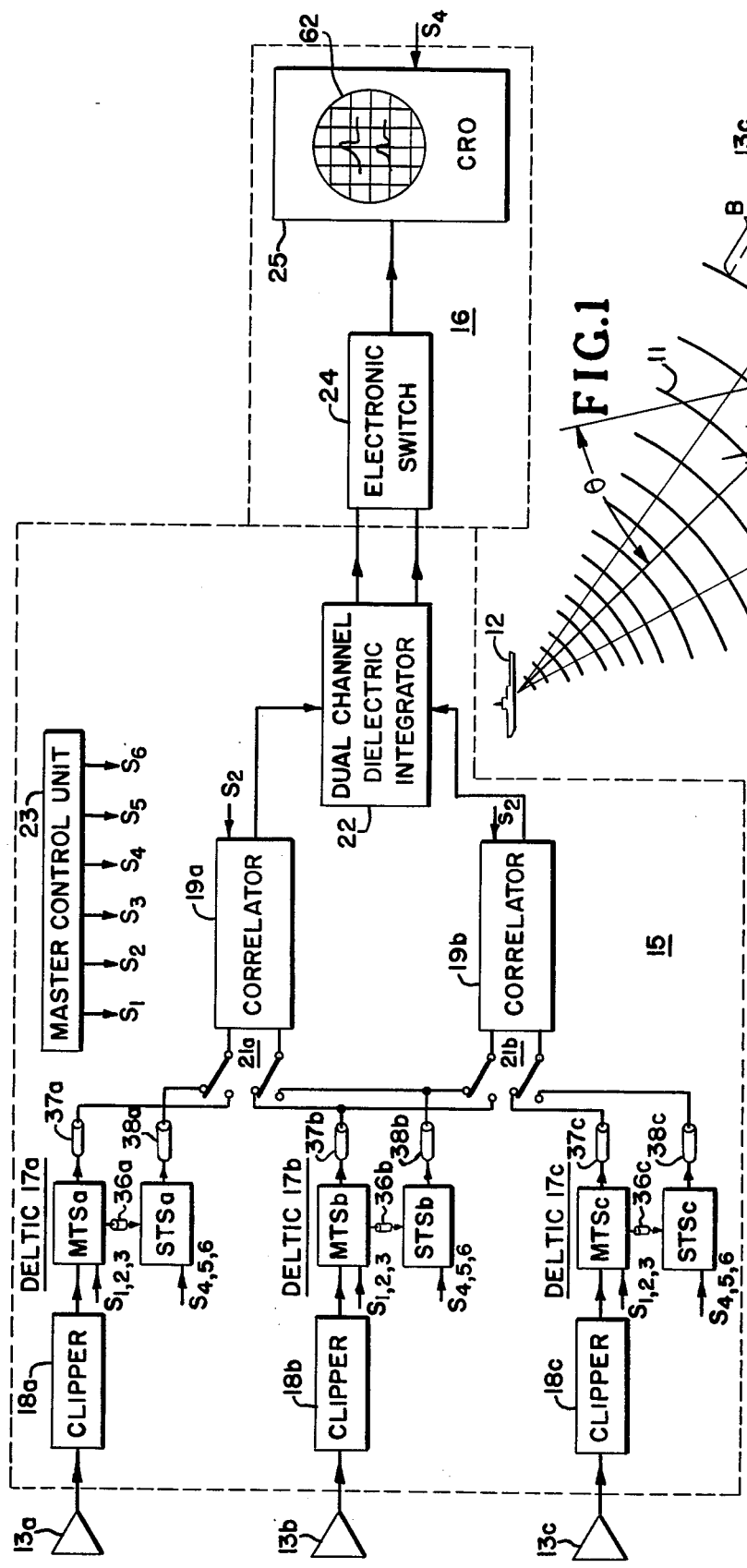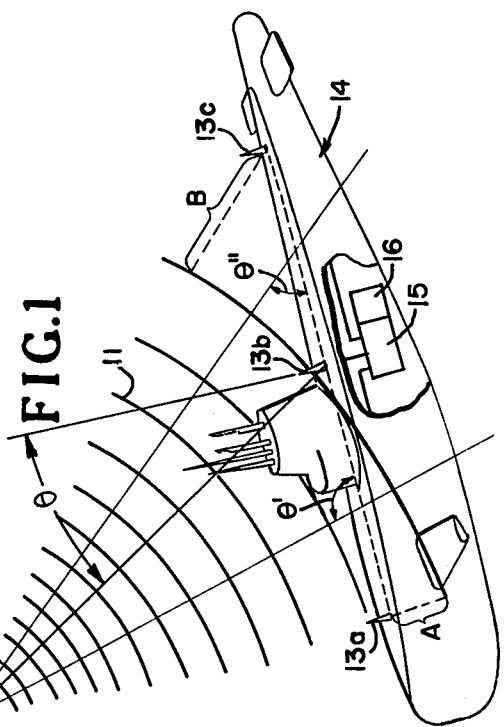

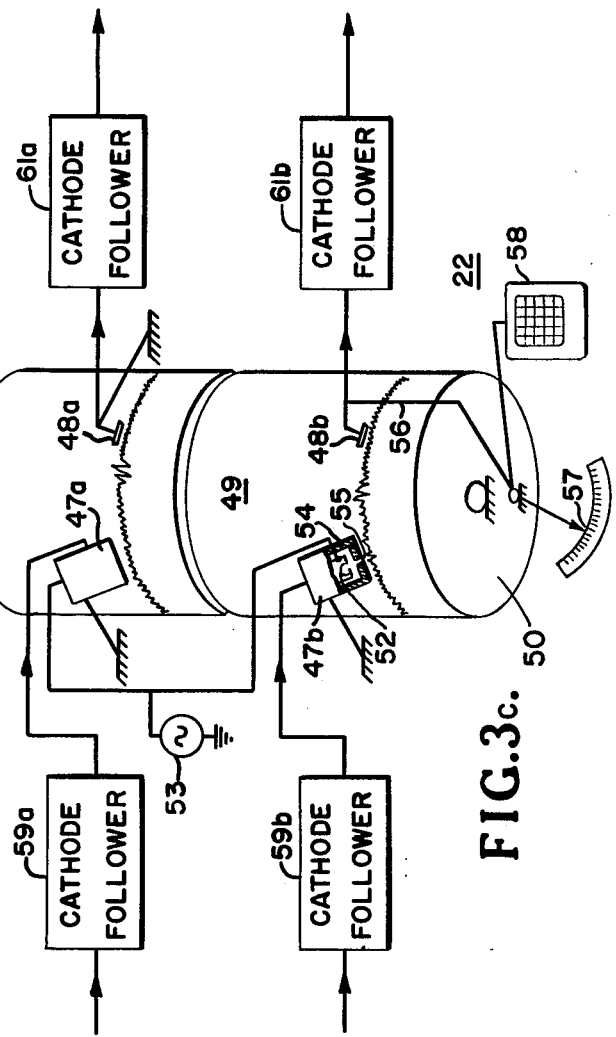

PASSIVE UNDERWATER TARGET DETECTION AND LOCATING SYSTEM

The invention described herein may be manufactured and used by or for the Government of the United States of America for governmental purposes without the payment of any royalties thereon or therefor.

This invention relates generally to apparatus for intercepting acoustical energy and for locating the relative position of the source thereof. More particularly, the present invention relates to a passive electronic system capable of detecting the acoustic spectrum vibrations of a remote underwater noise source, such for example as a submarine, and of processing the detected vibrations to provide a measure of the relative bearing and range of the noise source.

Although many active and passive electronic systems for detecting and locating an underwater noise source, or target, such for example as echo ranging SONAR and triangulation systems, have been heretofore devised and utilized in naval warfare, each of these prior art systems has been found to have certain inherent operational characteristics which tend to limit its usefulness in modern naval warfare, particularly in the realm of anti-submarine warfare. For example, the transmitted acoustical energy impulses of the active target detection systems can be intercepted by an enemy submarine, thereby revealing the presence of one's own submarine, or by the target submarine itself, thereby providing a warning for the target submarine to undertake evasive action. On the other hand, the passive target detection systems, such for example as those operating on the triangulation principles, require the use of several relatively remotely positioned stationary monitoring stations or mobile listening platforms, the relative positions and orientation of what must be accurately known, a very difficult problem in underwater detection from a mobile platform. Moreover, the use of both active and passive prior art underwater detection apparatuses is limited by the relatively large background noises accompanying the vibration signal emanating from a remote target source, as well as the distortions introduced into the radiated signal by thermal and other discontinuities in the transmitting liquid medium. This inherent limitation of the prior art systems has been aggravated by the recent technological advances in radiated noise reduction methods and the increased kill-range capability of submarine launched weapons which have greatly increased the need for more sensitive and longer range detection systems. An additional shortcoming of the prior art underwater target detection systems is their inability to provide an accurate determination of the relative position of a distant target from a mobile listening platform.

To obviate many of the shortcomings of the prior art underwater target detection apparatuses, a new passive technique of detecting and analyzing underwater acoustical signals, such for example as the acoustic noise or vibration signals generated by the operating machinery of a submarine, or other like vibration source, in the presence of a relatively large noise background has been devised. A system utilizing this new passive technique is disclosed in the copending application of Herman E. Ellingson, Ser. No. 568,681, filed Feb. 29, 1956, and of common assignee with this application. The underlying physical principle utilized in this new passive technique is that the energy wave fronts generated by the acoustic spectrum vibrations of a submarine in its surrounding liquid medium travel in concentric patterns. As the distance of a particular wave front from its promulgating source increases, a proportionate increase in its radius of curvature, and consequently decrease in the sagitta of arc thereof, occurs. Inasmuch as this characteristic of an acoustical frequency signal is largely independent of the amplitude of the signal, the deleterious effects of environmental discontinuities in the transmitting medium upon the transmitted signal are greatly minimized.

In the hereinbefore referred to copending application, three hydrophones, equidistantly spaced in line on a listening platform, are provided to intercept the wavefronts generated by the acoustic vibrations of a target source. An artificial electrical delay is introduced into the output of one end hydrophone until the two-way cross-correlation between the signal detected by it and the other end hydrophone is maximized. An artificial delay equal to one-half of the artificial delay introduced into the one end hydrophone is then introduced in the output of the center hydrophone to bring the center hydrophone back into straight line relation with the other two hydrophones. Then an additional delay is introduced in the output of the center hydrophone, until the three-way cross correlation between all hydrophones is maximized; this additional delay is necessary due to the slight curvature of the wavefront. Inasmuch as every point on the surface of each wave front vibrates substantially in phase, a maximized three-way cross correlation is representative of the simultaneous detection by all of the hydrophones of a particular wave front. The cross-correlations between hydrophones are made by a polarity coincidence correlator. The correlation maximum is determined by the plotting of a correlogram of the correlation existing for each time delay introduced. By a consideration of the geometry involved, a measure of the relative bearing of the noise source can be made by a determination of the delay time required to be introduced to maximize the two-way cross-correlation and introducing this value in the simple mathematical equation $$\theta = \sin^{-1} a/l_1 \qquad [1]$$

wherein, $\theta$ is the relative bearing angle of the noise source measured from a perpendicular to the hydrophone line at the center point between the two end hydrophones, $l_1$ is the time required for the acoustic signal to travel the separation distance between the two end hydrophones, and a is the required time delay. The slant range to the noise source is determined by converting the total time delay, that is the artificial plus the additional delay, required to be introduced into the center hydrophone for maximizing the three-way cross-correlation into a distance value b, FIG. 1, and introducing this value in the simple mathematical equation $$R = (l^2[\cos^2 \theta])/2X \qquad [2]$$

wherein, R is the slant range to the noise source, $l$ is the distance between the center and one end hydrophone, and X denotes the distance $[b - a/2]$.

Although the aforedescribed new passive target locating technique and apparatus have offered numerous advantages over the prior art active and passive systems, certain practical limitations exist therein which tend to limit the usefulness thereof under many tactical situations. For example, the relatively long time required to plot the correlograms necessitated the recording on a tape loop of the hydrophone outputs, and the repetitive replaying thereof. Furthermore, even with recording, several minutes were required for proper analysis of the recorded data. Inasmuch as the relative position of the target may change considerably during these time intervals, the resulting determinations of target range and bearing are not always correct. Moreover, if in order to reduce these processing time intervals only a small portion of the recorded data were to be analyzed, the potential accuracy of the system would not be obtainable.

Accordingly, it is a principal object of the present invention to provide a new and improved method and apparatus for determining the relative location of a noise source.

Another object of this invention is the provision of a new and improved passive electronic system for effecting a rapid and accurate determination of the location of a remote noise generating source.

Still another object of the present invention is to provide a new and improved underwater signal detection technique for rapidly and accurately analyzing a varying vibration signal from a remote vibration generating source in the presence of other randomly varying noise signals.

A further object of this invention is to provide new and improved means for rapidly and continuously scanning relatively large segments of the surrounding transmitting medium.

A still further object of the present invention is the provision of a sound detection method and apparatus capable of concurrently providing a measure of the relative positions of multiple independent sound generating sources.

Another still further object of this invention is to provide a new and improved underwater target detection apparatus capable of developing continuous target range and bearing information suitable for fire-control purposes.

Still another further object of this invention is the provision of means for concurrently scanning divers segments of the surrounding transmitting medium.

These and other objects of the present invention are achieved by a technique and apparatus which provide for the concurrent interception of the varying acoustic spectrum signal generated by a suitable target source by a multiplicity of signal detectors, repetitive sampling of small portions of the signal intercepted by each of the detectors and generation of compressed time base replicas in digital form of the sampled information, development of a two-way cross correlation function of the polarities of the signals intercepted by unique pairs of signal detectors, visually displaying each of the cross-correlation functions in a manner to indicate the time of occurrence of a maximum cross-correlation function for one pair of detectors and the displacement between the time of occurrence of the maximum cross-correlation function for two pairs of detectors.

The foregoing objects and many of the attendant advantages of this invention will be readily appreciated as the nature of the invention becomes better understood by reference to the following detailed description when considered in connection with the accompanying drawings, wherein:

FIG. 1 is a pictorial illustration of a typical tactical situation in which the instant invention is to be utilized;

FIG. 2 is a block diagrammatic view of the overall system of the present invention;

FIGS. 3a–3c are comprehensive block diagrammatic views of various stages of the overall system of FIG. 2;

Figure 3A:
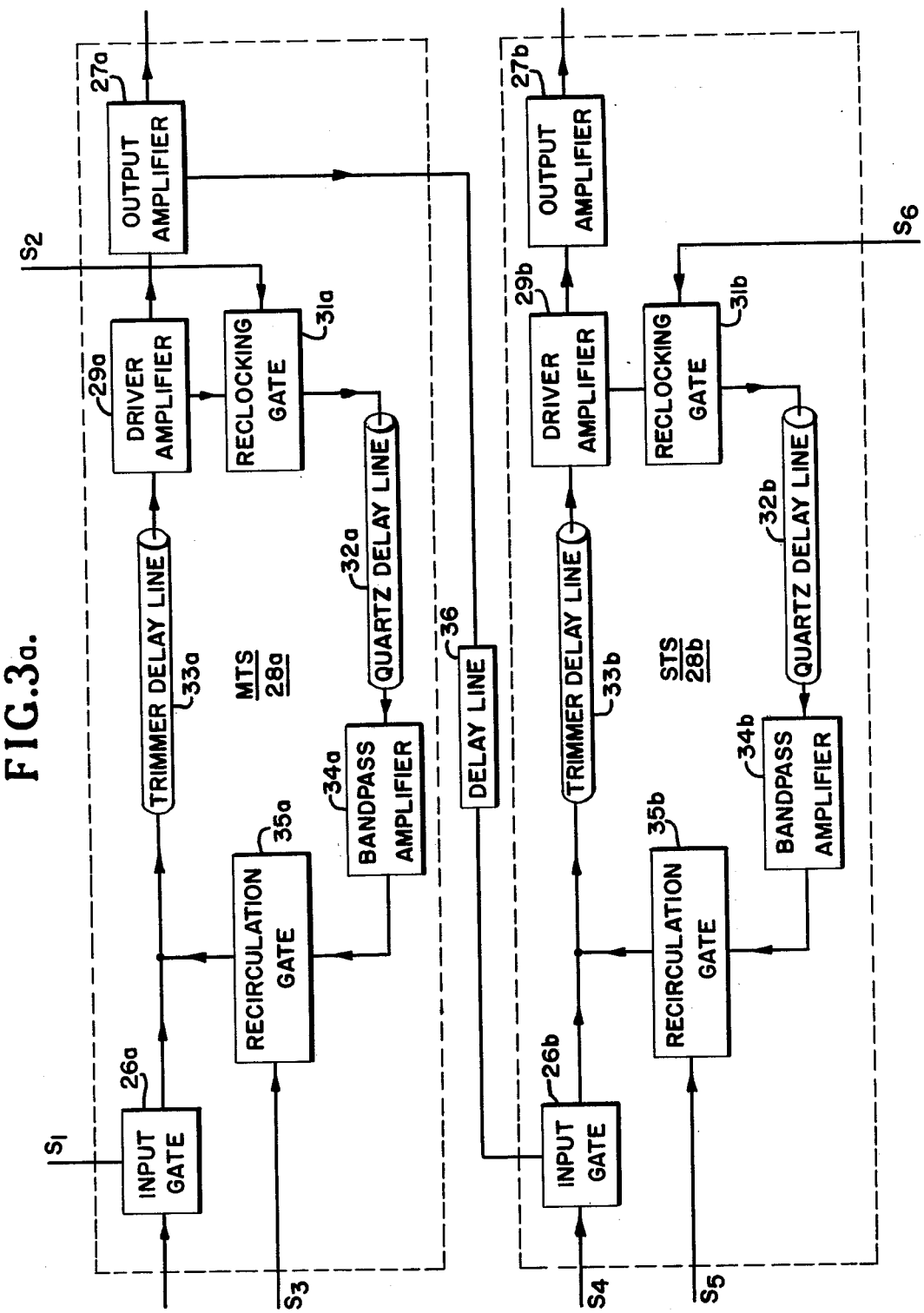

Referring now to the drawings wherein like reference characters designate similar or identical parts throughout the several views, and more particularly to FIG. 1 thereof whereon the acoustic spectrum energy wave-fronts 11 generated by a vibration source, such for example, as the target submarine 12 are shown as impinging upon a trio of hydrophones 13a, 13b and 13c, positioned on a line on a listening platform, such for example as a submarine 14. The hydrophones are preferably spaced at uniform intervals on a straight base line, though not necessarily so. The signals intercepted by the hydrophones are shown as being individually applied to a rapid electronic data processing apparatus 15 wherein the polarity of each of the detected acoustic signals is periodically sampled, converted into binary data form on a compressed time base, and correlograms representative of the two-way cross-correlation functions between the sampled data of the center hydrophone and each end hydrophone for varying time delays developed. The resultant correlograms are presented on an indicator unit 16 wherefrom a measure of the relative bearing and range of the target submarine can be obtained. It is to be understood that according to this invention, the relative bearing of the target submarine is essentially determined by measurement of the artificial delay required to be introduced into one end hydrophone to effect simultaneous reception with the center hydrophone, which procedure may be mathematically expressed by equation [1], while the slant range of the target submarine is determined by a procedure which can be regarded as a measurement of the difference in bearing; namely $\theta' - \theta''$, of lines from the midpoints of the line segments between the center hydrophone and each end hydrophone and which intersect at the target. Inasmuch as the magnitudes of the bearing angles $\theta'$ and $\theta''$ are proportional to the artificial delays, A and B, respectively, required to be introduced into each hydrophone for maximum two-way correlations, the target range can be determined by obtaining a measurement of the difference between the two artificial delays in terms of range. This relationship may be expressed mathematically by the equation $$R = ([l \cos \theta]^2)/(lA + B/v) \quad [3]$$

wherein R is the slant range, l is the distance between hydrophone pairs, $\theta$ is the relative bearing, v is the velocity of the acoustic signal in the medium, and a and B are respectively the artificial time delays, positive or negative, required to be introduced into each end hydrophone with respect to the center hydrophone for maximum two-way cross-correlations therebetween. By this procedure, a port-starboard ambiguity in relative bearing will be present which can be resolved either by use of another hydrophone displaced off the base line or by physically moving the hydrophones, as will be more fully explained hereinafter.

Referring now more particularly to FIG. 2, the data processing apparatus 15 is shown as consisting of clipper stages, 18a, 18b, 18c, each of which is coupled to the output of one of hydrophones, 13a, 13b, 13c, and signal sampling and compression units, 17a, 17b, 17c, individually coupled to each of the clipper stages, 18a, 18b, 18c, respectively. The clipper stages, although not essential, are preferably employed to insure the accurate conversion of the sampled detected acoustic signal into binary data representative of the polarity of the sampled signal. Each of units, 17a, 17b, 17c, is of the type known in the data processing art as a DELTIC, which term is an abbreviation of Delay Line Time Compressor. A pair of correlators, 19a, 19b, with associated selector switches 21a-21b, are also included to measure the degree of polarity coincidence between the acoustic signals detected by the divers pairs of hydrophones. A dielectric integrator 22, or other equivalent device, is also preferably included to provide for a point-wise addition of corresponding points in successive signal cycles of the degree of polarity coincidence over a selected number of sampling periods thereby to minimize the adverse effects of a low signal-to-noise ratio in the detected signals and improve the accuracy of the processed data. A master control stage 23 is also included to provide suitable synchronizing signals to insure the desired operational sequence of the various componental stages of the system. As also shown in FIG. 2, the indicator apparatus 16 includes an electronic signal switching circuit 24 and a single channel oscilloscope 25.

The underlying operating principle of the data processing apparatus 15, or the DELTIC correlator system as it may more vividly be described, is to sample the polarity of the detected signal during time portions T' thereof for a short time interval, $\Delta$, at N different times separated by the equal time intervals T. The sequence of N nearly instantaneous samples obtained in this manner is squeezed together on a reduced time base, just equal to the time T thereby to form a high speed replica, or time series, of binary data bits representative of the polarity of the sampled acoustic signal during the time interval T. This compressed replica is stored in a recirculating memory channel having a recirculation period equal to the time $T-\Delta$. This channel is known as the reference, or moving time series [MTS] channel. Each sample selected from the detected signal is introduced either as a pulse of uniform height [positive polarity] or of zero height, absence of pulse, [negative polarity] at the beginning of the replica in the memory channel and sequentially processes therethrough until after a time interval T' it will have appeared N times at the output of the memory channel and will have reached the end of the sequence of sample bits in the replica. This sample bit is then removed and replaced by a new sample of the detected signal. In the DELTIC correlator system, the correlation analysis of the polarity of the detected signal is accomplished by multiplying the detected signal by some comparison signal, a parameter of which, such for example as the time delay, is being varied. The resulting product is then averaged over a short finite time interval. By using the time compression properties of the DELTIC, the analysis of the detected signal which would involve averaging times of T' can be carried out on the high-speed replica with the much shorter averaging time T. In this way, N multiplying and averaging operations may be carried out by the correlator within the time interval T'. The correlation function of the detected signal is obtained by multiplying, or comparing, a sample thereof by a corresponding sample which has been delayed slightly. If the corresponding sample is of the same detected signal, an auto-correlation function will be made; if it is of another concurrently detected signal, a cross-correlation function will be made. This comparison process is repeated for a succession of different relative delay times. The succession of different relative delay times is provided by the generation of a high speed replica of preceding sample bits in another storage channel having a recirculation time equal to T. This channel is known as the comparison, or stationary time series [STS] channel. In this manner, the relative time delays between the two replicas increase by one sampling interval $\Delta$ during each successive recirculation period. Thus at the end of a time interval equal to the time portion T' of the detected signal, as now represented by its time-compressed replica, magnitudes of polarity coincidences for N different time displacements will be obtained. The polarity comparisons obtained in this manner are identical to those which could be obtained by the introduction of successively different artificial delays into a hydrophone output. After the time period T', a new replica can be introduced into the reference channel and a new two-way correlation function developed. DELTIC-correlator units suitable for this mode of operation are disclosed in the copending applicator of Victor C. Anderson, Ser. No. 585,827, filed May 18, 1956, now U.S. Pat. No. 2,958,039, issued Oct. 25, 1960, and in the U.S. Naval Ordnance Laboratory publication NAVORD Report 4244 of Sept. 6, 1956.

As more clearly shown in FIG. 3a, the MTS and STS channels of each DELTIC unit consist essentially of the same componental circuits; namely input gates 26a-26b, respectively, output amplifiers 27a-27b, respectively, and memory, or recirculation storage loops 28a-28b, respectively, designed to have different circulation periods.

Due to present day circuit design limitations and the acoustic spectrum of the vibration signals, it was found desirable in the instant signal detection system to sample a portion T' of each hydrophone output signal at 50 $\mu$sec spaced intervals and to introduce the sampled data into the DELTICs as binary data of a time duration $\Delta$ of 0.1 microsecond. To accomplish this sampling operation, a synchronizing signal $S_1$ consisting of a train of pulses of approximately $\Delta$ duration and a repetition rate of $1/T$ is provided by the master control unit 23 to the normally closed input gate 26a of the MTS channel of each DELTIC. Input gate 26a is operated in the well known manner to insert a pulse into the memory loop 28a for a hydrophone output signal of a positive polarity, such for example as would be developed in response to a compression of the transmitting medium about the hydrophone, and fails to insert a pulse for a hydrophone output signal of a negative polarity, such for example as would be developed in response to a rarefaction of the transmitting medium about the hydrophone. Upon insertion into the circulating memory loop 28a the amplitude of the sampled data is increased by a driver amplifier 29a to a suitable level for properly actuating a reclocking gate 31a. The reclocking gate 31a is provided with a synchronizing signal $S_2$ from the master control unit 23 which signal consists of a train of very narrow pulses of a repetition rate of $1/\Delta$. The synchronizing signal $S_2$ operates to correctly reposition the sampled data during each recirculation thereof to compensate for any partial mergers of adjacent data and for non-linear phase shift within the loop. In this way, errors in time are not permitted to accumulate but are corrected with each circulation thereby increasing the time base compression ability of the loop 28a. The data pulses are also standardized in amplitude by the reclocking gate 31a, which aids materially in maintaining stable circulation characteristics. This amplitude standardization is accomplished since the reclocking gate 31a has a saturation characteristic so that input pulses which exceed a given maximum threshold will give an essentially constant impulse from the output thereof, while signals that are under a given minimum threshold will give essentially a zero impulse from the output thereof. The train of sampled data is now stored in a quartz delay line 32a which constitutes the heart of the circulating memory loop. The length of the quartz delay line 32a is selected to provide the desired storage, or recirculation period of 49.9μ seconds which makes it possible to store 499 data bits in the memory loop. This stored information essentially represents 25 milliseconds of the acoustic signal originally detected. A delay line 33a, such for example as a vernier delay line, may be utilized to provide any required trimming of the storage element 32a. By this arrangement the replica stored in loop 28a appears to advance one data bit with each successively inserted sample when viewed at intervals equal to the time between samples. A bandpass amplifier 34a is provided to compensate for the energy loss occurring in the quartz memory element 32a. In order to make space available in the replica for each new data sample inserted by gate 26a into the circulating loop 28a a data sample within the loop must be dropped during each recirculation period. To accomplish this a normally open recirculation gate 35a is included in the memory loop 28a which gate, in response to a synchronizing signal $S_3$ provided by the master control unit, is closed for the duration of the oldest sample in the replica. The signal $S_3$ consists of a train of pulses of duration $\Delta$ and repetition rate 1/T transmitted to the gate 35a simultaneously with the transmission of the signal $S_1$ to the gate 26a. The length of the trimmer delay line 33a which may be required to effect the desired circulation time is dependent upon the magnitude of the transit time characteristics of the componential circuitry of its associated loop 28a. In other words, each sampled data bit selected from the hydrophone output signal is introduced at the beginning of the compressed replica; it then precesses through the replica until, after a time interval T', it will have appeared N times at the output amplifier of the storage channel in the course of progressing from the beginning to the end of the replica, or sequence of samples, after which it is removed from the replica.

At an initial arbitary time determined by the occurrence of the synchronizing signal $S_4$, which holds the input gate 26b open for an interval of time equal to T, all of the data bits stored in the replica of the MTS channel are transferred via its output amplifier 27a to the STS channel of the corresponding DELTIC unit. A delay line 36 may be introduced in the transfer path to provide suitable timing of introduction into the STS channel. As shown in FIG. 3a, the STS channel is composed of the same circuit elements as the MTS channel, which elements perform the same function as they do in the MTS channel. However, in the STS channel, the quartz delay line 32b, and its associated trimmer delay line 33b are designed to have a 50μ second memory characteristic. By making the recirculation time in the STS channel equal to the time interval T between sampling periods, the data bits in the memory loop 28b remain in the same position relative to successive comparison periods rather than advancing at a rate of one data bit per recirculation period as in the precessing replica of the MTS channel. Suitable synchronizing signals $S_4$ and $S_5$ each of which consists of a train of pulses of duration T and of period NT are simultaneously provided by the master control unit 23a to the input gate 26b and the recirculating gate 35b, respectively, to effect a periodic replacement of the replica stored in the STS channel with a new replica consisting of an entire sequence of data bits in the associated MTS channel. A synchronizing signal $S_6$, similar to $S_2$, is applied to the reclocking gate 31b for maintaining the sampled data bits in their proper sequential position within the replica time.

In order to develop the two-way cross-correlation functions between each end hydrophone and the center hydrophone, from which target range and bearing can be determined, each of correlators 19a and 19b is coupled to the STS and MTS channels of divers DELTIC units through selector switches 21a and 21b, respectively. In the illustrated position of the selector switches, correlator 19a will generate the cross-correlation function of the digital data bits in the replicas of the STSa and MTSb channels, and correlator 19b will generate the cross-correlation function of the digital data bits in the replicas of the STSb and MTSc channels. This specific arrangement will effect a sweep of the transmission medium forward of the beam of the listening submarine 14. For a sweep of the transmission medium aft of the beam, the selector switches are operated to their other position thereby providing for the generation of the cross-correlation function of the digital data bits in the replicas of the MTSa and STSb channels by correlator 19a and the generation of the cross-correlation function of the digital data bits in the replicas of the MTSb and STSc channels by correlator 19b. It is to be understood that if earlier detection of a target in the entire surrounding medium is of prime consideration, retention of selector switch 21a in its shown position and operation of selector switch 21b to a moved position will provide for a simultaneous sweep of both fore and aft sectors of the surrounding medium. To eliminate the generation of inaccurate correlation functions which may result from an initial incorrect overlay of the sampled data applied to the correlators and to insure the arrival of the sampled data at the proper time, coaxial delay lines 37a–37c and 38a–38c may be provided for the outputs of each of the MTS and STS channels, respectively. The length of the delay lines 37a–37c for the MTS channels are made longer than delay lines 38a–38c for the STS channels to compensate for the delay introduced in the sampled data of the STS channels by the delay line 36 interconnecting the associated MTS and STS channels of each DELTIC unit.

The binary nature of the sampled data is advantageously utilized by the correlators 19a and 19b for generating a correlation function upon the basis of polarity coincidence of the data bits in the replicas of the paired MTS and STS channels. Due to the high repetition rates used in the DELTIC units it has been found preferable for the correlators to count the number of polarity disagreements occurring during each comparison period T between the two replicas applied thereto. Inasmuch as the total percent of polarity agreements and disagreements is 100% no loss of information results from this approach. As more clearly shown in FIG. 3b, the identically constructed correlators each includes a clipper amplifier 39 and 40 individual to the incoming replicas from the paired MTS and STS channels, respectively, for amplifying and clipping down the input signals to a uniform level. This operation compensates for the degradation in the signals resulting from passage through the delay lines 37a and 38a, respectively. These equal amplitude signals are applied to an adder circuit 41 wherein they are added together to provide a composite output signal. This composite signal may be considered to exhibit a +1 characteristic when both input signals are positive, a 0 characteristic if the input signals are out of phase, and a −1 characteristic if both input signals are negative. The composite signal is simultaneously applied to two saturable type decision gates 42 and 43, to which gates is also applied a synchronizing signal $S_2$ from the master control unit 23. Decision gate 42 is biased in the well known manner to generate an output pulse in response to a composite signal of a magnitude representative of positive polarity input signals. Decision gate 43 is biased in the well known manner to provide for the generation of an output pulse in response to a composite signal representative of negative polarity or opposite phase input signals. The synchronizing signal $S_2$ applied to both decision gates insures a polarity comparison during a small fraction of each $\Delta$ interval, preferably during the center of the composite signal for maximum reliability. The output pulses of the decision gates 42 and 43 are applied to a difference amplifier 44 wherein an output signal representative of the polarity differences between the outputs of the two decision gates is developed and integrated over approximately the interval T in an R-C integrator network 45. This integration results in the development of an output signal representative of the percent polarity difference, which is analogous to the correlation. A variable gain output amplifier 46 having a relatively low output impedance is included in each correlator to obtain operation of the dielectric integrator 22 over its maximum dynamic range. It will be appreciated that by the aforedescribed mode of operation, the correlator effects a data bit by data bit polarity comparison between the two replica signals during each period T thereby developing an output which is a measure of the point-by-point polarity-coincidence correlation for the particular time displacement existing between the two replicas during each period T. By use of the DELTIC units, the correlator is capable of making $\Delta T$ comparisons in each period T, the interval between samples in the incoming data. Thus in each time interval T, a point on the correlogram is generated which is based on $\Delta T$ samples and which represents a time displacement between the two replicas of data samples of T greater than the previous point. In other words, with the assumed time parameters, the correlation between two hydrophones is plotted at a rate of one point each $50\mu$ seconds, with successive points representing time displacements of the hydrophone signal of $50\mu$ seconds, and each point being representative of 25 milliseconds of raw data. Consequently, 500 point counts representing a maximum time displacement of 25 milliseconds is developed every 25 milliseconds thereby resulting in the analysis of the incoming hydrophone signals as fast as they are developed.

Considering the extent of the interfering noise present in the acoustic signal detected by the hydrophones 13a–13c, it is desirable to effect integration of the processed sampled data additional to that available in the correlators to improve the statistical stability of the processed data thereby to provide a maximum degree of accuracy in the systems determination of the target range and bearing. This additional integration is preferably provided by a dielectric integrator 22 of the electrostatic type, as disclosed in the copending application of Victor C. Anderson, Ser. No. 585,827, filed May 18, 1956, now U.S. Pat. No. 2,958,039, issued Oct. 25, 1960, and in NavOrd Report 4243 of Oct. 25, 1956, a U.S. Naval Ordnance Laboratory publication by B. L. Snavely. As pictorially illustrated in FIG. 3c, the dielectric integrator 22 consists essentially of recording heads 47a–47b, pick-up heads 48a–48b, and a drum 49 composed of two dielectric material segments, backed up by a grounded conductive surface 50. The drum is rotated at a uniform speed by an electric motor 51 in synchronism with the sweep of the DELTICS, which in the instant device results in a drum revolution every 25 milliseconds. By this synchronizing rotational speed, a given drum position corresponds to the same time in each cyle of the applied trace signal. Recording head 47a, pick-up head 48a and the drum segment contiguous thereto constitutes an integrating channel for the output trace of correlator 19a while recording head 47b, pick-up head 48b and the drum segment contiguous thereto constitutes an integrating channel for the output trace of correlator 19b.

The recording heads consist essentially of an arc generating electrode assembly 52 energized by a suitable high-frequency source 53 for developing positive and negative ions within a metallic chamber 54 having a narrow adjustable width slit 55 formed in the flat end thereof contiguous to the drum 49. The generated ions tend to drift through the slit into the air spaced between the surface of drum 49 and chamber 54. The number and polarity of ions attracted to the drum surface depends basically upon the slit width and the potential difference between the chamber 54, respectively. Under these conditions, the associated drum segment tends to assume the instantaneous potential level of the chamber 54. Consequently, application of the correlator output trace across its respective ion chamber and the grounded surface 50 of the drum varies the charges on the drum surface at an exponential rate. The time constant of this exponential change is termed the integration time of the device 22. By varying the width of the slit 55, the number of available ions can be limited to such a degree as to require the application of a number of successive traces from the associated correlator before the electrostatic charge on the drum subjacent the recording head will assume the potential level of the ion chamber of the recording head. By means of this adjustment, the integration time of the dielectric integrator 22 can be selectively varied to suit the particular tatical situation. The pick-up heads 48a–48b may consist of shielded electrodes contiguously positioned relative to the drum surface for detection of the charges by electrostatic induction.

Figure 4A:
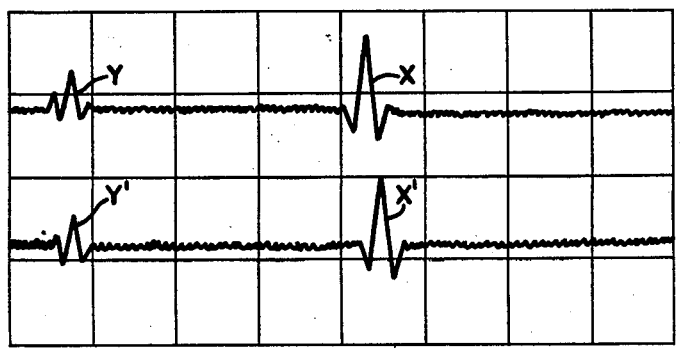
FIGS. 4a–4b are views of correlograms generated by the overall system of FIG. 2 which provides a measure of the target position; and, FIG. 5 is a pictorial illustration of the manner in which the relative target bearings may be determined.

The time required for a point on the drum surface to travel from the recording head to the pick-up head represents a particular time interval. Consequently, by mounting one of the pick-up heads, such for example as pick-up head 48b, on an arm 56 which can be rotated on a pivot concentric with the drum 49, the relative angular positions of the recording head 47b and the pick up head 48b about the drum can be varied to provide a desired difference between the time delays of the two integrating channels, for a purpose to be explained more fully hereinafter. The magnitude of this relative delay difference can be indicated by a pointer and calibrated scale assembly 57. In addition, a graphic recorder 58 may be employed to provide a continuous indication of the relative delays introduced during a particular tactical situation. Cathode followers 59a–59b and 61a–61b are included as input and output circuits for the integrating channels to provide suitable impedance matches between the dielectric integrator 22 and the correlators 19a–19b and electronic switching circuit 24. Switching circuit 24 provides for the rapid alternative application of the two charge traces developed by the integrator 22 to the horizontal deflection circuit of a conventional single gun oscilloscope 25 thereby effectively displaying both input signals simultaneously, as shown in FIG. 4a. With the selector switches 21a and 21b in the position shown in FIG. 2, the top correlogram of FIG. 4a represents the two-way cross-correlation between hydrophones 13a–13b as a function of time delay, while the bottom correlogram represents the two-way cross-correlation between hydrophones 13b–13c as a function of time delay. The peak vertical deflections in each correlogram represent the time delays at which maximum cross-correlation occurs for each of hydrophone pairs 13a–13b and 13b–13c.

Figure 4B:
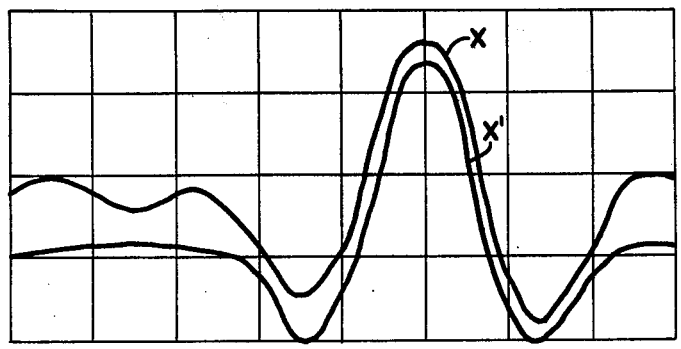

The slant range of the target submarine 12 may be determined by simultaneously observing both correlograms upon the oscilloscope and by varying the time delay introduced by pick-up head 48b of the dielectric integrator 22 until the peak vertical deflections of both correlograms coincide, as shown in FIG. 4b. The magnitude of the time displacement required to effect this coincidence corresponds to the time delay difference represented by the term (A+B) in equation (3). The range can therefore be determined by substituting the value of this term in equation (3).

The relative target bearing can be determined by positioning a grid 62 (FIG. 2), the vertical divisions of which are calibrated in terms of time delay, upon the oscilloscope tube and measuring the position from the start of the sweep at which the peak vertical deflection of one correlogram occurs. This time delay corresponds to the term a in equation (1) and consequently the relative bearing can be determined by substituting the value of a into the equation. Obviously, this operation can be performed manually or by mechanical means.

Figure 5:
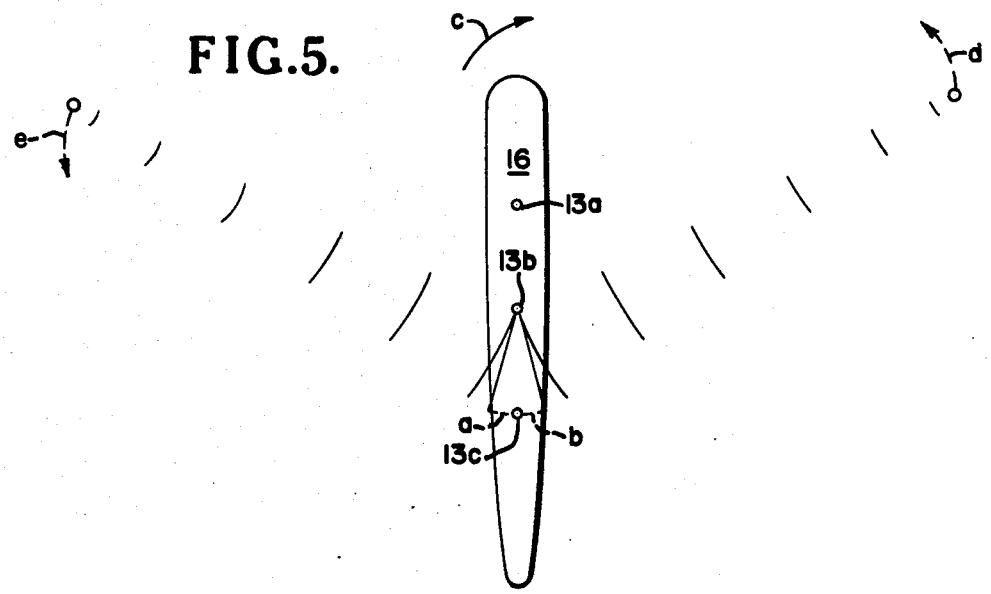

As discussed hereinbefore, a port-starboard ambiguity in target bearing exists due to the fact that the delay introduced into one end hydrophone 13c to effect a maximum two-way cross-correlation with the center hydrophone 13b can be in either direction, as indicated by dashed lines a and b in FIG. 5. This problem is readily resolved by either a port or starboard movement of the submarine platform 16. If it be assumed that a starboard movement is imparted to the submarine, as indicated by the arrow c, if the detected target is on the starboard side, it will appear to assume a more forwardly position relative to the submarine, as indicated by the arrow d, whereas if the detected target is on the port side, it will appear to assume a more aft position relative to the submarine, as indicated by the arrow e. There is no ambiguity between bearings forward of the platform beam with bearing aft thereof because a time delay must be added to the output of end hydrophone 13a to bring it into coherence with the output of the center hydrophone 13b for acoustic signals originating forward of the beam.

As indicated by the double pair of peak deflections x−x' and y−y' on the correlogram display of FIG. 4a, the relative bearing and range of more than one target noise source can be concurrently determined by the apparatus of the instant invention. Where multiple target noise sources are detected the identification of the peak deflections on the displayed pair of correlograms with a particular target noise source can be readily made in view of the fact that different type targets develop dissimilar spectrum noises which result in distinguishable peak deflections on the correlograms. Inasmuch as the peak deflection on each correlogram from a particular target is proximately located, the identification of the peak deflections generated by targets of different relative bearing is easily determined. In tactical situations where the multiple targets have substantially the same relative bearing but are at different ranges from the listening submarine, a distinguishable difference in the amplitude of the peak deflections from each target simplifies the identification thereof.

It is to be understood that since the correlograms generated by the dielectric integrator 22 contain information which is a measure of the relative bearing and range of a target, the automatic range and bearing tracking techniques widely used in RADAR can be employed. Each correlogram can be placed in the center of a gate and kept there with an automatic tracker. The relative target bearing can be determined by automatically measuring the time from the start of the sweep to one of the tracking gates and converting this data into bearing through a simple computer device. The target range can be determined by automatically measuring the time difference between the tracking gates, and converting this data into range in a simple computer device, which also takes into account the previously determined relative bearing of the target.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A system for locating a radiating source comprising a plurality of mutually spaced radiation detectors, first means for correlating the output of one of said detectors with the output of a second of said detectors, second means for correlating the output of the second of said detectors with the output of a third detector, means coupled to said first and second correlating means for separately integrating the outputs thereof to produce a pair of integrated signals, and means for delaying one of said integrated signals with respect to the other of said integrated signals, whereby the delay is indicative of the range of the source from the detectors when the maximum amplitude of the delayed integrated signal coincides with the maximum amplitude of the other integrated signal.

2. Apparatus for locating an energy radiating source comprising a plurality of transducer means having a predetermined relative spatial disposition for detecting the radiated energy, first circuit means individually coupled to each of said transducer means for periodically sampling the detected energy and for developing a binary signal indicative thereof on a compressed time base, second circuit means coupled to a unique pair of said first circuit means for developing an output signal representative of the magnitude of the polarity coincidence of the binary signals of the associated unique pair of first circuit means, third circuit means for effectively displaying the output signal of each of said second circuit means simultaneously, calibrated means for indicating the relative bearing of the source from the output signals displayed on said third circuit means, and adjustable means coupled between said third circuit means and said second circuit means for effecting a preselected relative displacement of the displayed output signals thereby indicating the range of the source.

3. Apparatus according to claim 2 and including means for effecting a particular physical displacement of said plurality of transducer means.

4. A system for locating an acoustic energy radiating source comprising a plurality of transducer means spaced at uniform intervals on a substantially straight line for detecting the radiated acoustic energy, first circuit means individually coupled to each of said transducer means for periodically sampling the polarity of the detected acoustic energy and for developing moving time and stationary time digital signals representative thereof on a compressed time base, said moving time and stationary time digital signals being identical series of digital pulses wherein said moving time series is continually delayed in time relative to said stationary time series once each signal comparison period for a complete comparison cycle, said comparison signal cycle including a predetermined number of successive comparison periods, second circuit means coupled to a pair of said first circuit means for periodically comparing the moving time, signal of one of said coupled pair of first circuit means and the stationary time signal of the other of said coupled pair of first circuit means and for developing an output signal representative of the magnitude of polarity coincidence between the compared signals for each successive comparison period, third circuit means individual to each of said second circuit means for integrating corresponding comparison periods in the output signal of its associated second circuit means for a selected number of successive comparison cycles and for developing a resultant signal correlative thereto, means for selectively adjusting the number of successive comparison periods included in one of said resultant signals, resultant signal display means, and fourth circuit means for effectively applying the resultant signals of said third circuit means concurrently to said signal display means.

5. A system according to claim 4, and including means for effecting a particular angular physical displacement of said plurality of transducer means relative to the energy radiating source.

6. Apparatus for determining the position of an acoustic energy emanating source comprising a multiplicity of transducer means spaced at uniform intervals on a straight line, for intercepting the emanated acoustic energy, first circuit means individually coupled to each of said transducer means for periodically sampling the polarity of the intercepted acoustic energy and for developing a digital signal indicative thereof on a reduced time base, second circuit means selectively coupled to a pair of said first circuit means for producing an output signal having instantaneous magnitudes corresponding to the degree of polarity coincidence of the digital signals of the associated unique pair of said first circuit means for successive divers time delay intervals, third circuit means individual to each of said second circuit means for producing a resultant signal correlative to the integration of a predetermined number of successive corresponding instantaneous magnitudes of the output signal of its associated second circuit means, fourth circuit means for effectively presenting the resultant signal produced by each of said third circuit means concurrently on a calibrated display, and fifth circuit means for selectively varying the number of successive, corresponding instantaneous magnitudes of the output signal utilized by one of said third circuit means in producing its resultant signal.

7. Apparatus for locating a vibration energy radiating source comprising a trio of transducer means spaced at uniform intervals on a straight line for detecting the radiated vibration energy, three pairs of circulating memory loops, first circuit means individually coupled to each of said transducer means for periodically sampling the detected vibration energy for a first predetermined time duration and for storing the sampled vibration energy as digital signal data bits of a second predetermined time duration substantially less than said first time duration in a respective one of said pairs of circulating memory loops, the circulation time of one memory loop being equal to said first time duration and the circulation time of the second memory loop being equal to said first time duration less said second time duration, second circuit means coupled to a pair of said first circuit means for developing an output signal representative of the degree of polarity coincidence of the digital signal data bits in said one memory loop of one of the coupled pair of first circuit means and the digital signal data bits in said second memory loop of the other of the coupled pair of first circuit means for successive comparison periods each of which is of said first time duration, third means individual to each of said second circuit means for developing an electrical signal corresponding to the average of the output signal of its associated second circuit means for a selected number of comparison periods, means operatively coupled with one of said third means for selectively varying the number of comparison periods included in the electrical signal developed by it, electrical signal display means and fourth circuit means for effectively applying the electrical signals developed by said third means concurrently to said display means.

8. A system for locating an acoustic energy radiating source comprising a plurality of transducer means spaced at uniform intervals on a substantially straight line for detecting the radiated acoustic energy, first circuit means individually coupled to each of said transducer means for intermittently sampling the polarity of the detected acoustic energy and for generating moving time and stationary time digital signals indicative thereof on a compressed time base, said moving time and stationary time digital signals being identical series of digital pulses wherein said moving time series is continually delayed in time relative to said stationary time series once each signal comparison period for a complete comparison cycle, said comparison signal cycle including a predetermined number of successive comparison periods, second circuit means coupled to unique pairs of said first circuit means for periodically comparing the moving time signal of one of said coupled pair of first circuit means with the stationary time singal of the other of said coupled pair of first circuit means and for developing an output signal representative of the magnitude of polarity coincidence between the compared signals during each comparison period, third means for individually storing the output signal of each of said second circuit means as an electrostatic charge representative of the magnitude of polarity coincidences between the compared signals for a preselected number of corresponding comparison periods in successive signal comparison cycles, first circuit switching means for selectively varying the unique pair of first circuit means coupled to each of said second circuit means, electrostatic charge indicating means, second circuit switching means for alternatively applying the electrostatic charge of each of said third means to said indicating means in rapid succession, fourth circuit means for providing suitable synchronizing signals to said first, and second circuit means and said indicating means, range calibrated means responsive to the difference in the number of comparison periods represented by each of the stored electrostatic charges, and bearing calibrated means responsive to the position of the electrostatic charges applied to said indicating means.

9. Apparatus for locating a vibration energy radiating source comprising a trio of transducers spaced at uniform intervals on a straight line for detecting the radiated vibration energy, a first circulating memory loop individually coupled to each of said transducers for periodically sampling the detected vibration energy and for generating a digital signal representative of the polarity of the detected vibration energy during each sampling period, a second circulating memory loop individual to each first circulating memory loop for periodically receiving the entire digital signal contained therein, said circulating memory loops having divers circulation intervals for each comparison period occurring during a comparison cycle, a pair of correlator circuits, the input of one of which is coupled to the first circulating memory loop associated with one of said transducers and the second circulating memory loop associated with another of said transducers, and the input of the other of which is coupled to the second circulating memory loop associated with said one transducer and the first circulating memory loop associated with said other transducer, each of said correlator circuits developing an output signal representative of the degree of polarity coincidences occurring during a comparison period of the digital signals contained in the circulating memory loops coupled thereto, a dielectric integrating channel individually coupled to each of said correlator circuits for generating an electrostatic charge representative of the degree of polarity coincidences for a preselected number of corresponding sampling periods during successive comparison cycles, means for simultaneously graphically presenting the electrostatic charges generated by each dielectric integrating channel, and means for effecting a preselected displacement in the preselected number of sampling periods represented by the electrostatic charge generated by one dielectric integrating channel.

10. Apparatus according to claim 9, and including an amplitude clipper circuit interposed between each of said trio of transducers and the first circulating memory loop individually coupled thereto.

11. Apparatus according to claim 9, and including selector switches coupled to the inputs of said pair of correlator circuits.

12. Apparatus according to claim 9 wherein said graphically presented means includes a cathode-ray oscilloscope, and an electronic switching circuit connected to the horizontal deflection circuit thereof.

13. Apparatus according to claim 9 and including means for effecting a particular angular physical displacement of said trio of transducers relative to the energy radiating source.

14. Apparatus for locating a vibration energy radiating source comprising a trio of transducers spaced at uniform intervals on a straight line for detecting the radiated vibration energy, a data processing apparatus individually coupled to each of said transducers for periodically sampling the detected vibration energy at constant time intervals and for generating a pair of recirculating high-speed time compressed signal replicas containing digital signal data bits of a short time duration representative of the polarity of the detected vibration energy during each sampling period, the recirculation time of one of said signal replicas being equivalent to said time interval between each sampling period and the recirculation time of the other of said replicas being equivalent to said time interval less said short duration time, a pair of correlator circuits, one of which is coupled to receive said one signal replica of one of said transducers and said other signal replica of another of said transducers, and the other of which is coupled to receive said other signal replica of said one transducer and said one signal replica of said other transducer, each of said correlator circuits generating an output signal the instantaneous magnitude of which is representative of a point-by-point comparison of the digital signal data bits in the signal replicas received by the respective correlator circuit, a pair of dielectric integrating channels each of which is individually coupled to each of said pair of correlator circuits for generating an electrical signal correlative to the degree of polarity coincidences existing over a predetermined number of corresponding point-by-point comparisons in the signal of the respective correlator circuit, a cathode ray oscilloscope, an electronic switching circuit connected between said oscilloscope and each pair of dielectric integrating channel for effectively displaying the electrical signal generated by said integrating channels concurrently on said oscilloscope, calibrated scale means for indicating the range of the detected vibration energy source from the displayed electrical signals, and means for selectively varying the number of comparisons in one of said electrical signals.

15. A passive method of measuring the relative position of an energy radiating source in the presence of interfering radiation comprising simultaneously receiving the energy radiations of the source at least at three mutually spaced positions, periodically sampling the polarity of the received energy radiations for short time intervals, generating a pair of digital signal replicas of divers recirculating periods representative of the sampled polarity of the energy radiations received at each spaced position, generating correlograms indicative of the magnitude of polarity coincidence of the recirculating digital signal replicas from discrete pairs of the three spaced positions, selectively displacing one correlogram relative to the other correlograms, and simultaneously displaying said correlograms on a calibrated medium, the position of the maximum polarity coincidence of one correlogram and the magnitude of displacement necessary to effect coincidence in the positions of the maximum polarity coincidences of both correlograms being a measure of the relative bearing and range, respectively, of the energy radiating source.

\* \* \* \* \*